United States Patent
Takahashi et al.

(10) Patent No.: US 11,699,933 B2
(45) Date of Patent: Jul. 11, 2023

(54) ROTARY ELECTRIC MACHINE WITH TWO-POLE ROTOR AND THREE-PHASE ARMATURE WINDING

(71) Applicant: Mitsubishi Heavy Industries, Ltd., Tokyo (JP)

(72) Inventors: Kazuhiko Takahashi, Tokyo (JP); Harumasa Tsuchiya, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 198 days.

(21) Appl. No.: 17/147,825

(22) Filed: Jan. 13, 2021

(65) Prior Publication Data

US 2021/0257871 A1    Aug. 19, 2021

(30) Foreign Application Priority Data

Feb. 19, 2020   (JP) ................................ 2020-025882

(51) Int. Cl.
*H02K 3/28*    (2006.01)
*H02K 3/32*    (2006.01)
(Continued)

(52) U.S. Cl.
CPC ................. *H02K 3/28* (2013.01); *H02K 3/32* (2013.01); *H02K 3/02* (2013.01); *H02K 19/12* (2013.01)

(58) Field of Classification Search
CPC ............... H02K 3/00; H02K 3/28; H02K 3/32
See application file for complete search history.

(56) References Cited

U.S. PATENT DOCUMENTS 3,408,517 A * 10/1968 Willyoung ............... H02K 3/28
                                                          310/198
3,660,705 A     5/1972 Willyoung
                      (Continued)

FOREIGN PATENT DOCUMENTS

DE     1613092 A1    10/1970
EP     1976097 A2    10/2008
                (Continued)

OTHER PUBLICATIONS

Extended European Search Report dated Jun. 29, 2021 for European Patent Application No. 20217792.9.
(Continued)

*Primary Examiner* — Tran N Nguyen
(74) *Attorney, Agent, or Firm* — Volpe Koenig

(57) ABSTRACT

A rotary electric machine comprises a two-pole rotor, a three-phase armature winding, and a stator core having fifty-four slots. An armature winding is stored as a top coil piece and a bottom coil piece in two layers in the slot of the stator core and has three parallel circuits and two phase belts per one phase. Each phase belt includes two parallel circuits. When a sequence of the first and second parallel circuits of one phase belt is viewed from a side closer to a phase belt center, those parallel circuits are arranged in a sequence of the first, second, first, first, second, first, first, first, and second parallel circuits in the top coil pieces and in a sequence of the first, second, first, first, second, first, first, first, and second parallel circuits in the bottom coil pieces to be connected to the top coil pieces. For a sequence of the second and third parallel circuits of the other the phase belt, those parallel circuits are arranged in a sequence of the third, second, third, third, second, third, third, third, and second parallel circuits in the top coil pieces and in a sequence of the third, second, third, third, second, third, third, third, and (Continued)

second parallel circuits in the bottom coil pieces to be connected to the top coil pieces.

3 Claims, 3 Drawing Sheets

(51) Int. Cl.
 *H02K 3/02* (2006.01)
 *H02K 19/12* (2006.01)

(56) References Cited

U.S. PATENT DOCUMENTS

| | | |
|---|---|---|
| 6,388,357 B1 | 5/2002 | Tokumasu et al. |
| 2008/0088196 A1* | 4/2008 | Takahashi ............... H02K 3/28 310/198 |
| 2013/0221792 A1* | 8/2013 | Tokumasu ............... H02K 3/12 310/203 |

FOREIGN PATENT DOCUMENTS

| | | |
|---|---|---|
| JP | 54-006683 A | 3/1979 |
| JP | 2000-050549 A | 2/2000 |
| JP | 2001-309597 A | 11/2001 |

OTHER PUBLICATIONS

Japanese Office Action dated Oct. 25, 2022 for Japanese Patent Application No. 2020-025882.
Japanese Office Action dated Apr. 25, 2023 for Japanese Patent Application No. 2020-025882.

* cited by examiner

ROTARY ELECTRIC MACHINE WITH TWO-POLE ROTOR AND THREE-PHASE ARMATURE WINDING

CLAIM OF PRIORITY

The present application claims priority from Japanese Patent application serial no. 2020-25882, filed on Feb. 19, 2020, the content of which is hereby incorporated by reference into this application.

BACKGROUND OF THE INVENTION

The present invention relates to a rotary electric machine, specifically, the rotary electric machine suitable for large-sized generators such as turbine generators.

Large currents outputted from the large-capacity generator may cause the armature winding to generate a large electromagnetic force and a high heat value. The approach is taken for avoiding the above-described phenomenon by providing the armature winding composed of a plurality of parallel circuits to reduce the current per one armature winding so that the electromagnetic force or the temperature rise is moderated.

U.S. Pat. No. 3,660,705 as a first patent literature and Japanese Unexamined Patent Application Publication No. 2001-309597 as a second patent literature disclose relevant techniques as described above.

U.S. Pat. No. 3,660,705 discloses that each phase of the armature winding is composed of three parallel circuits. For the purpose of minimizing the number of inter-polar connection rings for connection between poles, paired segments of the respective phase belts are connected in series with a lead wire, and the rest is connected to the counterpart of the opposite phase belt in series with the inter-polar connection ring.

Japanese Unexamined Patent Application Publication No. 2001-309597 discloses the armature winding for the rotary electric machine such as the large-capacity turbine generator. Specifically, the disclosed armature winding for the rotary electric machine is configured to have fifty-four slots for suppressing the unbalanced voltage by restraining the current imbalance caused by circulating currents among two poles and three parallel circuits.

Japanese Unexamined Patent Application Publication No. 2001-309597 discloses the armature winding of the rotary electric machine. The armature winding includes fifty-four slots for housing coils of three parallel circuits. The armature winding is of three-phase two-pole two-layer type for suppressing the voltage generated across the respective circuits, and the circulating current as well. Each phase of the armature winding constitutes the three parallel circuits. The coils of the three parallel circuits are housed in those fifty-four slots formed in the stator core where each phase is divided into the first phase belt and the second phase belt. The coils of the respective circuits are serially connected, and divided into the top coil piece and the bottom coil piece. One of the connection side coil end and the counter-connection side coil end of each coil of the first and the second phase belts is provided with at least one jumper connection to interchange the circuit number sequence between the top coil piece and the bottom coil piece.

SUMMARY

In U.S. Pat. No. 3,660,705, although the number of the inter-polar connection rings may be reduced, the current imbalance caused by the circulating current between the parallel circuits cannot be restrained, resulting in less possibility to lessen the loss of the armature winding.

In Japanese Unexamined Patent Application Publication No. 2001-309597, the number of the inter-polar connection rings for connecting poles of the winding is increased, requiring further improvement for lessening the loss of the armature winding.

The present invention provides the rotary electric machine which ensures to lessen the loss of the armature winding by decreasing the number of the inter-polar connection rings for inter-polar connection of the winding, and restraining the current imbalance caused by the circulating current between the parallel circuits.

The above described object is achieved by the appendant claims.

According to a first aspect of the present invention, there is provided a rotary electric machine which includes a two-pole rotor, a three-phase armature winding, and a stator core having fifty-four slots in each of which the armature winding is stored as a top coil piece and a bottom coil piece in two layers, top and bottom. One phase of the armature winding has three parallel circuits. One of the three parallel circuits includes an inter-polar connection ring for connecting two different poles, and each of two other circuits has a connection ring that constitutes the same pole. The armature winding has two phase belts per one phase, each including two parallel circuits. When an average circumferential position of all the top coil pieces and the bottom coil pieces for forming the phase belts is defined as a phase belt center, and an arrangement sequence of the first and second parallel circuits of at least one of the phase belts is viewed from a side closer to the phase belt center, the first and second parallel circuits are arranged in a sequence of the first, second, first, first, second, first, first, first, and second parallel circuits in the top coil pieces or the bottom coil pieces and in a sequence of the first, second, first, first, second, first, first, first, and second parallel circuits in the other bottom coil pieces to be connected to those parallel circuits of the top coil pieces or the other top coil pieces to be connected to those parallel circuits of the bottom coil pieces. When an arrangement sequence of the second and third parallel circuits of the other of the phase belts is viewed from the side closer to the phase belt center, the second and third parallel circuits are arranged in a sequence of the third, second, third, third, second, third, third, third, and second parallel circuits in the top coil pieces or the bottom coil pieces and in a sequence of the third, second, third, third, second, third, third, third, and second parallel circuits in the other bottom coil pieces to be connected to those parallel circuits of the top coil pieces or the other top coil pieces to be connected to those parallel circuits of the bottom coil pieces.

According to another aspect of the present invention, when an arrangement sequence of the first and second parallel circuits of at least one of the phase belts is viewed from a side closer to the phase belt center, the first and second parallel circuits are arranged in a sequence of the first, second, first, first, second, first, second, first, and first parallel circuits in the top coil pieces or the bottom coil pieces and in a sequence of the first, second, first, second, first, first, first, second, and first parallel circuits in the other bottom coil pieces to be connected to those parallel circuits of the top coil pieces or the other top coil pieces to be connected to those parallel circuits of the bottom coil pieces. When an arrangement sequence of the second and third parallel circuits of the other of the phase belts is viewed from the side closer to the phase belt center, the second and third parallel circuits are arranged in a sequence of the third, second, third, third, second, third, second, third, and third parallel circuits in the top coil pieces or the bottom coil pieces and in a sequence of the third, second, third, second, third, third, third, second, and third parallel circuits in the other bottom coil pieces to be connected to those parallel circuits of the top coil pieces or the other top coil pieces to be connected to those parallel circuits of the bottom coil pieces.

According to the present invention, the loss of the armature winding may be lessened by decreasing the number of the inter-polar connection rings for inter-polar connection of the winding, and restraining the current imbalance caused by the circulating current between the parallel circuits.

DETAILED DESCRIPTION OF THE PREFERRED EMBODIMENTS

Hereinafter, an explanation will be made with respect to the rotary electric machine according to the present invention with reference to illustrated embodiments. The same components in the respective embodiments will be designated with the same reference signs.

The rotary electric machine according to the present invention such as a turbine generator includes an armature winding in which a winding circuit is formed around a stator core having a plurality of axially extending slots at predetermined pitches in a circumferential direction. The winding circuit includes a pole formed by connecting coils housed in the slots in series, and a connection ring for connecting a line terminal and a neutral terminal to the coils. The coil and the connection ring are connected at a coil end portion. The connection ring is connected to the line terminal and the neutral terminal across the space at an axial end of the stator core at a collector ring side from a portion connected to the coil in the circumferential direction.

Figure 1:
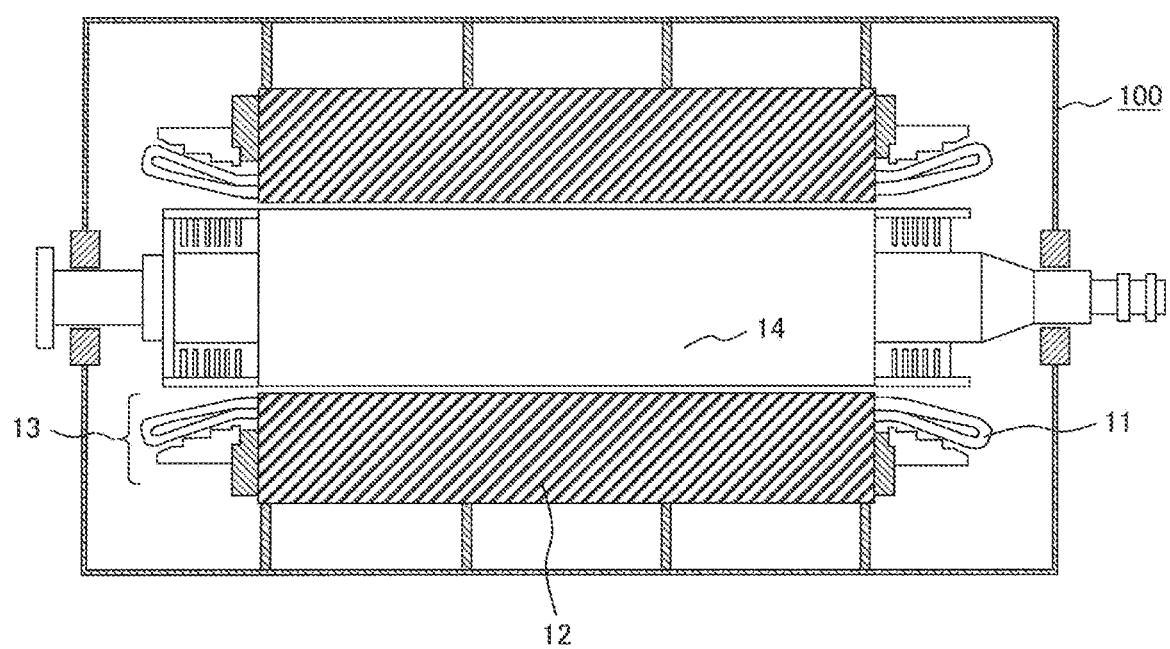
FIG. 1 schematically illustrates a structure of a turbine generator as an example of a rotary electric machine according to the present invention.

FIG. 1 illustrates the above-configured turbine generator.

Referring to the drawing, a turbine generator 100 includes a two-pole three-phase armature winding 11 which is housed in fifty-four slots formed in a stator core 12. A stator 13 is constituted by the armature winding 11 and the stator core 12. The turbine generator 100 includes a rotor 14 with a magnetic field generator disposed on an inner circumference of the stator 13, which is positioned substantially coaxially with the stator 13 while being separated therefrom via a gap.

A feeding device including a collector ring and a brush is disposed at an axial end of the turbine generator 100, and a turbine is disposed at the other axial end so that mechanical outputs are transferred to the rotor 14. At the collector ring side, lead-out wires 6 (see FIG. 2) of the respective phases of the armature winding 11 are disposed. Corresponding to the lead-out wire, a bushing and a terminal box are disposed so that the armature winding 11 is connected to the line terminal and the neutral terminal.

First Embodiment

Figure 2:
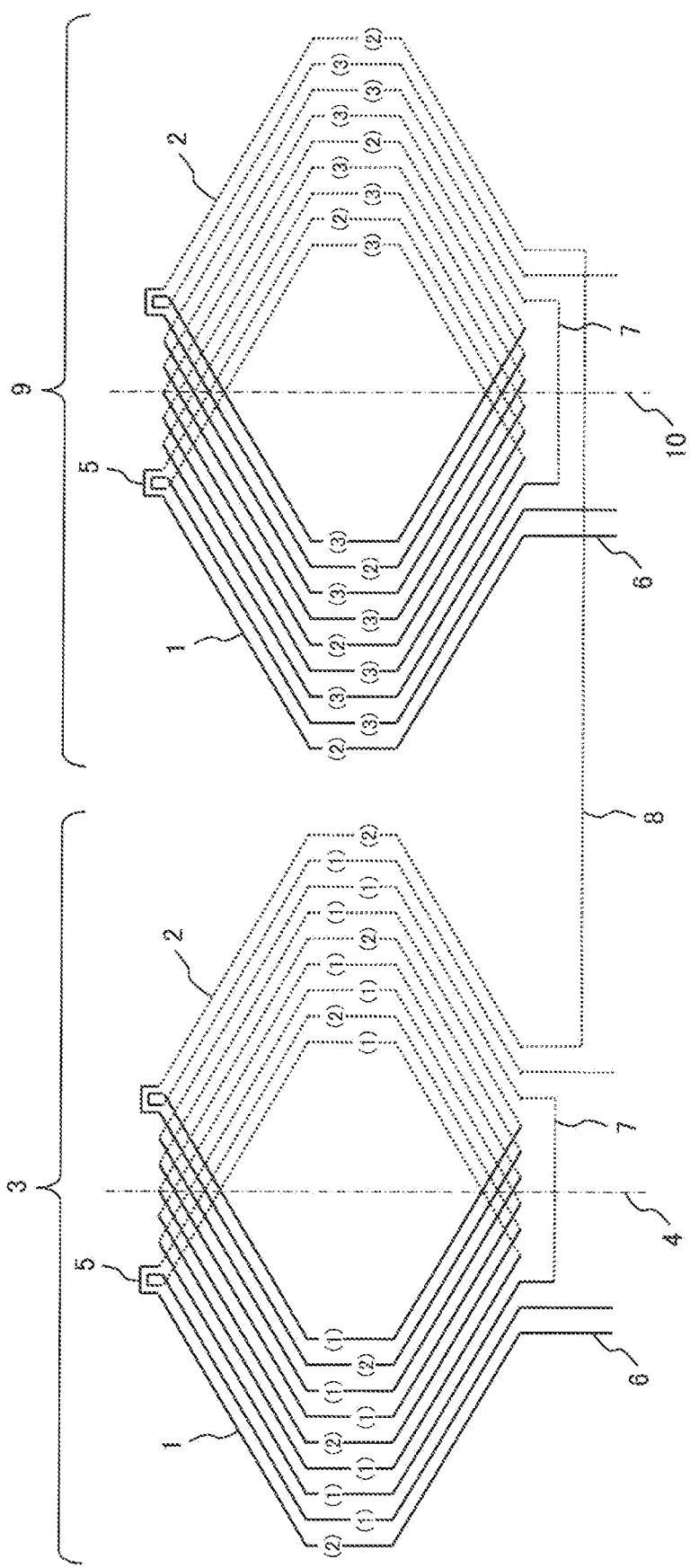
FIG. 2 illustrates a connection method in the case of two phase belts of the rotary electric machine of a first embodiment according to the present invention.

FIG. 2 illustrates a connection method in the case of two phase belts of the rotary electric machine of a first embodiment according to the present invention.

Referring to the drawing, the rotary electric machine (turbine generator 100) of the embodiment includes the two-pole rotor 14, the three-phase armature winding 11, and the core (stator core 12) having fifty-four slots for housing the armature winding 11. The armature winding 11 is stored as a top coil piece 1 and a bottom coil piece 2 in two layers, top and bottom in the slot. One phase of the armature winding 11 has three parallel circuits.

One of the three parallel circuits is disposed in an N-pole, another one is disposed in an S-pole, and a remaining one is disposed across an area between the N-pole and the S-pole. The top coil piece 1 and the bottom coil piece 2 each at a different angle in a circumferential direction are connected with a jumper connection 5.

One of those three parallel circuits includes an inter-polar connection ring 8 for connecting two different poles, and each of the two other circuits has a connection ring 7 constituting the same pole. The armature winding 11 has two phase belts 3, 9 per one phase. Each of the phase belts 3, 9 includes two parallel circuits. When an average circumferential position of all the top coil pieces 1 and the bottom coil pieces 2 for forming the phase belt 3 or 9 is defined as a phase belt center 4 or 10, and the arrangement sequence of the first and second parallel circuits of at least one of the phase belts, that is, the phase belt 3 is viewed from the side closer to the phase belt center 4, the first and second parallel circuits are arranged in the sequence of the first, second, first, first, second, first, first, first, and second parallel circuits in the top coil pieces 1 and in the sequence of the first, second, first, first, second, first, first, first, and second parallel circuits in the bottom coil pieces 2 to be connected to those parallel circuits of the top coil pieces 1. When the sequence of the second and third parallel circuits of the other one of the phase belts, that is, the phase belt 9 is viewed from the side closer to the phase belt center 10, the second and third parallel circuits are arranged in the sequence of the third, second, third, third, second, third, third, third, and second parallel circuits in the top coil pieces 1 and in the sequence of the third, second, third, third, second, third, third, third, and second parallel circuits in the bottom coil pieces 2 to be connected to those parallel circuits of the top coil pieces 1.

The structure as described in the embodiment ensures to make the degree of the current imbalance caused by the circulating current between the parallel circuits lower than the current imbalance in the case of the generally employed structure. This makes it possible to provide the rotary electric machine with the armature winding 11 having its loss lessened.

A modification of the first embodiment allows interchange of the parallel circuit arrangement sequence between the top coil pieces 1 and the bottom coil pieces 2 of the phase belt 3 and/or the phase belt 9. In the case of the interchange of the parallel circuit arrangement sequence between the top coil pieces 1 and the bottom coil pieces 2 of both the phase belts 3 and 9 in the first embodiment, when the arrangement sequence of the first and second parallel circuits of at least one of the phase belts, that is, the phase belt 3 is viewed from the side closer to the phase belt center 4, the first and second parallel circuits are arranged in the sequence of the first, second, first, first, second, first, first, first, and second parallel circuits in the bottom coil pieces 2 and in the sequence of the first, second, first, first, second, first, first, first, and second parallel circuits in the top coil pieces 1 to be connected to those parallel circuits of the bottom coil pieces 2. When the arrangement sequence of the second and third parallel circuits of the other one of the phase belts, that is, the phase belt 9 is viewed from the side closer to the phase belt center 10, the second and third parallel circuits are arranged in the sequence of the third, second, third, third, second, third, third, third, and second parallel circuits in the bottom coil pieces 2 and in the sequence of the third, second, third, third, second, third, third, third, and second parallel circuits in the top coil pieces 1 to be connected to those parallel circuits of the bottom coil pieces 2.

The modification of the first embodiment, in which the parallel circuit arrangement sequence is interchanged between the top coil pieces 1 and the bottom coil pieces 2 of the phase belt 3 and/or the phase belt 9 provides the similar effects to those derived from the first embodiment.

Second Embodiment

Figure 3:
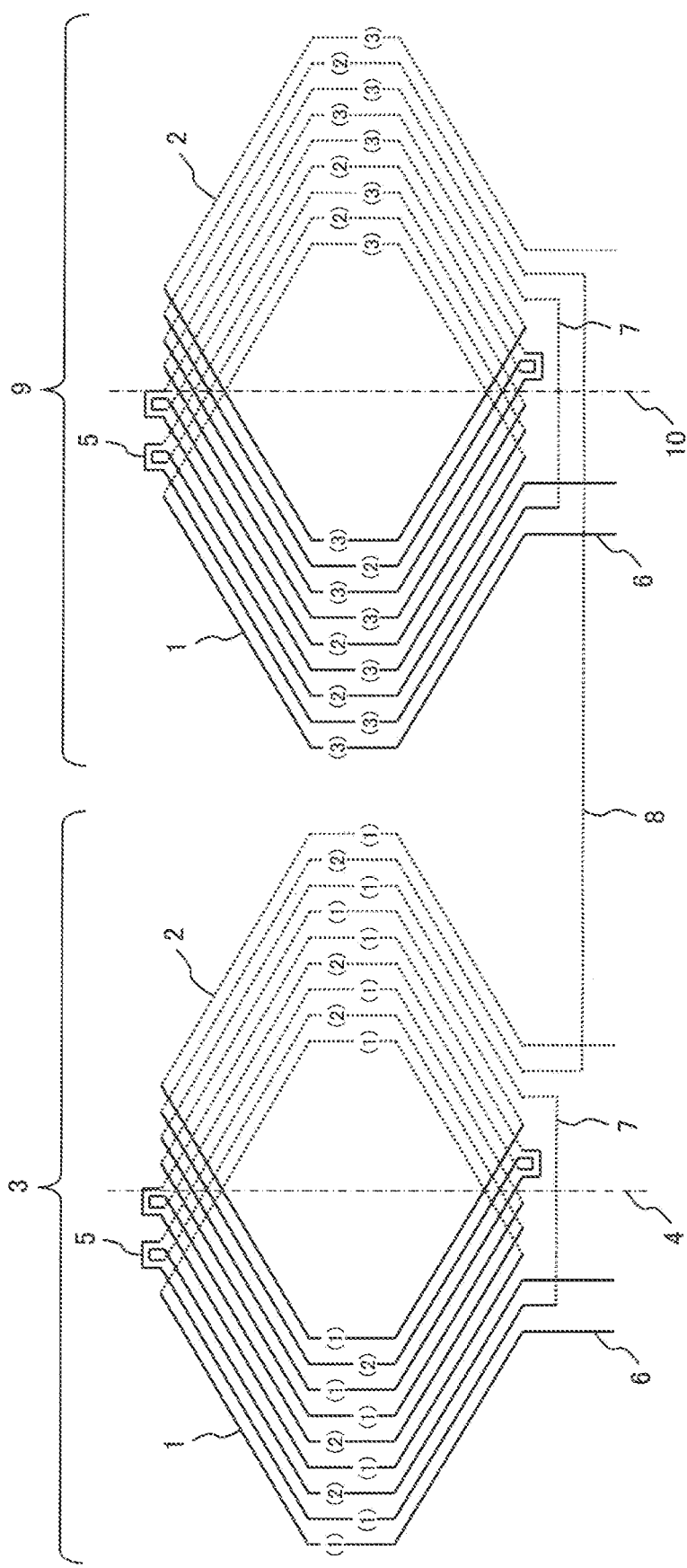
FIG. 3 illustrates a connection method in the case of two phase belts of the rotary electric machine of a second embodiment according to the present invention.

FIG. 3 illustrates a connection method (the method for connecting the armature winding 11 as shown in FIG. 1) in the case of two phase belts of the rotary electric machine of a second embodiment according to the present invention.

As the drawing illustrates, the rotary electric machine (turbine generator 100) of the embodiment includes the two-pole rotor 14, the three-phase armature winding 11, the core (stator core 12) having fifty-four slots for housing the armature winding 11. The armature winding 11 is stored as a top coil piece 1 and a bottom coil piece 2 in two layers, top and bottom in the slot. One phase of the armature winding 11 has three parallel circuits.

One of the three parallel circuits is disposed in the N-pole, another one is disposed in the S-pole, and the remaining one is disposed across the area between the N-pole and the S-pole. The top coil piece 1 and the bottom coil piece 2 each at a different angle in a circumferential direction are connected with a jumper connection 5.

One of those three parallel circuits includes the inter-polar connection ring 8 for connecting two different poles, and each of the two other circuits has the connection ring 7 constituting the same pole. The armature winding 11 has two phase belts 3, 9 per one phase. Each of the phase belts 3, 9 includes two parallel circuits. When the average circumferential position of all the top coil pieces 1 and the bottom coil pieces 2 for forming the phase belt 3 or 9 is defined as the phase belt center 4 or 10, and the arrangement sequence of the first and second parallel circuits of at least one of the phase belts, that is, the phase belt 3 is viewed from the side closer to the phase belt center 4, the first and second parallel circuits are arranged in the sequence of the first, second, first, first, second, first, second, first, and first parallel circuits in the top coil pieces 1 and in the sequence of the first, second, first, second, first, first, first, second, and first parallel circuits in the bottom coil pieces 2 to be connected to those parallel circuits of the top coil pieces 1. When the arrangement sequence of the second and third parallel circuits of the other one of the phase belts, that is, the phase belt 9 is viewed from the side closer to the phase belt center 10, the second and third parallel circuits are arranged in the sequence of the third, second, third, third, second, third, and third parallel circuits in the top coil pieces 1 and in the sequence of the third, second, third, second, third, third, third, second, and third parallel circuits in the bottom coil pieces 2 to be connected to those parallel circuits of the top coil pieces 1.

The structure of the embodiment as described above provides the similar effects to those derived from the first embodiment.

A modification of the second embodiment allows interchange of the parallel circuit arrangement sequence between the top coil pieces 1 and the bottom coil pieces 2 of the phase belt 3 and/or the phase belt 9. In the case of the interchange of the parallel circuit arrangement sequence between the top coil pieces 1 and the bottom coil pieces 2 of both the phase belts 3 and 9 in the second embodiment, when the arrangement sequence of the first and second parallel circuits of at least one of the phase belts, that is, the phase belt 3 is viewed from the side closer to the phase belt center 4, the first and second parallel circuits are arranged in the sequence of the first, second, first, first, second, first, second, first, and first parallel circuits in the bottom coil pieces 2 and in the sequence of the first, second, first, second, first, first, first, second, and first parallel circuits in the top coil pieces 1 to be connected to those parallel circuits of the bottom coil pieces 2. When the arrangement sequence of the second and third parallel circuits of the other one of the phase belts, that is, the phase belt 9 is viewed from the side closer to the phase belt center 10, the second and third parallel circuits are arranged in the sequence of the third, second, third, third, second, third, second, third, and third parallel circuits in the bottom coil pieces 2 and in the sequence of the third, second, third, second, third, third, third, second, and third parallel circuits in the top coil pieces 1 to be connected to those parallel circuits of the bottom coil pieces 2.

The modification of the second embodiment, in which the parallel circuit arrangement sequence is interchanged between the top coil pieces 1 and the bottom coil pieces 2 of the phase belt 3 and/or the phase belt 9 provides the similar effects to those derived from the second embodiment.

The present invention is not limited to the above-described embodiments, and includes various modifications. Specifically, the embodiments have been described in detail for readily understanding of the present invention. The present invention is not necessarily limited to the one provided with all structures as described above. It is possible to partially replace a structure of one of the embodiments with a structure of another embodiment, or add the structure of one of the embodiments to the structure of another embodiment. It is also possible to add, eliminate, and replace a part of the structure of one of the embodiments to, from, and with the structure of another embodiment.

REFERENCE SIGNS LIST

1 . . . top coil piece,
2 . . . bottom coil piece,
3, 9 . . . phase belt,
4, 10 . . . phase belt center,
5 . . . jumper connection,
6 . . . lead-out wire,
7 . . . connection ring at the same pole,
8 . . . inter-polar connection ring,
11 . . . armature winding,
12 . . . stator core,
13 . . . stator,
14 . . . rotor,
100 . . . turbine generator

What is claimed is:

1. A rotary electric machine comprising:
    a two-pole rotor;
    a three-phase armature winding; and
    a stator core having fifty-four slots in each of which the three-phase armature winding is stored as a top coil piece and a bottom coil piece in two layers of top and bottom,
    wherein one phase of the a three-phase armature winding has three parallel circuits;
    one of the three parallel circuits includes an inter-polar connection ring that connects two different poles, and each of two other circuits has a connection ring that constitutes the same pole;
    the three-phase armature winding has two phase belts per one phase, each of the phase belts including two parallel circuits;
    when an average circumferential position of all top coil pieces and bottom coil pieces that respectively form the phase belts is defined as a phase belt center, and an arrangement sequence of the first and second parallel circuits of at least one of the phase belts is viewed from a side closer to the phase belt center, the first and second parallel circuits are arranged in a sequence of the first, second, first, first, second, first, first, first, and second parallel circuits in the top coil pieces or the bottom coil pieces and in a sequence of the first, second, first, first, second, first, first, first, and second parallel circuits in the other bottom coil pieces to be connected to the top coil pieces or the other top coil pieces to be connected to the bottom coil pieces; and
    when an arrangement sequence of the second and third parallel circuits of the other of the phase belts is viewed from the side closer to the phase belt center, the second and third parallel circuits are arranged in a sequence of the third, second, third, third, second, third, third, third, and second parallel circuits in the top coil pieces or the bottom coil pieces and in a sequence of the third, second, third, third, second, third, third, third, and second parallel circuits in the other bottom coil pieces to be connected to the top coil pieces or the other top coil pieces to be connected to the bottom coil pieces.

2. A rotary electric machine comprising a two-pole rotor; a three-phase armature winding; and a stator core having fifty-four slots in each of which the three-phase armature winding is stored as a top coil piece and a bottom coil piece in two layers of top and bottom,
    wherein one phase of the three-phase armature winding has three parallel circuits;
    one of the three parallel circuits includes an inter-polar connection ring that connects two different poles, and each of two other circuits has a connection ring that constitutes the same pole;
    the three-phase armature winding has two phase belts per one phase, each of the phase belts including two parallel circuits;
    when an average circumferential position of all top coil pieces and bottom coil pieces that respectively form the phase belts is defined as a phase belt center, and an arrangement sequence of the first and second parallel circuits of at least one of the phase belts is viewed from a side closer to the phase belt center, the first and second parallel circuits are arranged in a sequence of the first, second, first, first, second, first, second, first, and first parallel circuits in the top coil pieces or the bottom coil pieces and in a sequence of the first, second, first, second, first, first, first, second, and first parallel circuits in the other bottom coil pieces to be connected to the top coil pieces or the other top coil pieces to be connected to the bottom coil pieces; and
    when an arrangement sequence of the second and third parallel circuits of the other of the phase belts is viewed from the side closer to the phase belt center, the second and third parallel circuits are arranged in a sequence of the third, second, third, third, second, third, second, third, and third parallel circuits in the top coil pieces or the bottom coil pieces and in a sequence of the third, second, third, second, third, third, third, second, and third parallel circuits in the other bottom coil pieces to be connected to the top coil pieces or the other top coil pieces to be connected to the bottom coil pieces.

3. A rotary electric machine comprising:
    a two-pole rotor;
    a three-phase armature winding; and
    a stator core having fifty-four slots in each of which the three-phase armature winding is stored as a top coil piece and a bottom coil piece in two layers of top and bottom,
    wherein one phase of the three-phase armature winding has three parallel circuits;
    one of the three parallel circuits is disposed in an N pole, another one is disposed in an S pole, and a remaining one is disposed across an area between the N pole and the S pole; and
    the top and the bottom coil pieces each at a different angle in a circumferential direction are connected with a jumper connection
    wherein the parallel circuit disposed across the area between the N pole and the S pole includes an inter-polar connection ring that connects the N pole and the S pole, and each of the parallel circuits disposed in the N pole and the S pole has a connection ring that constitutes the same pole; and
    the three-phase armature winding has two phase belts per one phase, each of the phase belts including two parallel circuits, one of the phase belts including the parallel circuit disposed in the N pole and the parallel circuit disposed across the area between the N pole and the S pole, and the other of the phase belts including the parallel circuit disposed in the S pole and the parallel circuit disposed across the area between the N pole and the S pole.

* * * * *